US011275893B1

(12) United States Patent
Zaman et al.

(10) Patent No.: US 11,275,893 B1
(45) Date of Patent: Mar. 15, 2022

(54) REFERENCE DOCUMENT GENERATION USING A FEDERATED LEARNING SYSTEM

(71) Applicant: Accenture Global Solutions Limited, Dublin (IE)

(72) Inventors: Md. Faisal Zaman, Drumcondra (IE); Gopal Kavanadala Sridhar, Dublin (IE); Jee Hyub Kim, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/084,187

(22) Filed: Oct. 29, 2020

(51) Int. Cl.
| | |
|---|---|
| *G06F 17/00* | (2019.01) |
| *G06F 40/205* | (2020.01) |
| *G06F 40/169* | (2020.01) |
| *G06N 20/00* | (2019.01) |
| *G06F 40/284* | (2020.01) |
| *G06F 40/40* | (2020.01) |

(52) U.S. Cl.
CPC .......... *G06F 40/205* (2020.01); *G06F 40/169* (2020.01); *G06F 40/284* (2020.01); *G06F 40/40* (2020.01); *G06N 20/00* (2019.01)

(58) Field of Classification Search
CPC ...... G06F 40/205; G06F 40/40; G06F 40/169; G06F 40/284; G06N 20/00
See application file for complete search history.

(56) References Cited

U.S. PATENT DOCUMENTS

| | | | | |
|---|---|---|---|---|
| 10,346,494 | B2 * | 7/2019 | Rehurek | G06F 16/2237 |
| 10,558,747 | B2 * | 2/2020 | Bao | G06F 16/36 |
| 10,803,399 | B1 * | 10/2020 | Cohen | G06F 16/93 |
| 2006/0026203 | A1 * | 2/2006 | Tan | G06N 5/022 |
| 2016/0124944 | A1 * | 5/2016 | Andreoli | G06F 40/51 704/2 |
| 2018/0336183 | A1 * | 11/2018 | Lee | G06N 5/022 |
| 2018/0365248 | A1 * | 12/2018 | Zheng | G06F 40/40 |
| 2019/0392035 | A1 * | 12/2019 | Indenbom | G06F 40/284 |
| 2020/0184151 | A1 * | 6/2020 | Ekmekci | G06F 9/542 |
| 2020/0226126 | A1 * | 7/2020 | Zou | G06F 16/24578 |
| 2020/0327151 | A1 * | 10/2020 | Coquard | G06F 40/56 |

(Continued)

OTHER PUBLICATIONS

Gururangan, Suchin, et al., "Don't Stop Pretraining: Adapt Language Models to Domains and Tasks," May 5, 2020, 19 pages, University of Washington, Seattle, WA.

(Continued)

*Primary Examiner* — Laurie A Ries
(74) *Attorney, Agent, or Firm* — Harrity & Harrity, LLP

(57) ABSTRACT

In some implementations, a device may receive a first document from a first client device. The device may parse the first document into first sentences. The device may receive a second document from a second client device. The device may parse the second document into second sentences. The device may select a first sentence of the first document and a second sentence of the second document. The device may convert the first sentence into a first vector and the second sentence into a second vector. The device may determine a similarity score associated with the first vector and the second vector. The device may determine, based on the similarity score, that a first word set in the first sentence and a second word set in the second sentence correspond to a reference annotation. The device may perform an action associated with the reference annotation.

20 Claims, 8 Drawing Sheets

(56) References Cited

U.S. PATENT DOCUMENTS

| | | | |
|---|---|---|---|
| 2020/0327172 A1* | 10/2020 | Coquard | G06F 16/9035 |
| 2021/0064657 A1* | 3/2021 | Gopalan | G06K 9/6215 |
| 2021/0065041 A1* | 3/2021 | Gopalan | G06N 20/00 |
| 2021/0264115 A1* | 8/2021 | Wang | G06N 7/005 |

OTHER PUBLICATIONS

Khandelwal, Urvashi, et al., "Generalization through Memorization: Nearest Neighbor Language Models," Feb. 15, 2020, 13 pages, Stanford University.

* cited by examiner

US 11,275,893 B1

REFERENCE DOCUMENT GENERATION USING A FEDERATED LEARNING SYSTEM

BACKGROUND

Federated learning is a machine learning technique that trains an algorithm across multiple decentralized devices. The decentralized devices may utilize locally stored training data that is not exchanged between the devices.

SUMMARY

In some implementations, a method includes receiving, by a device, a first document from a first client device; parsing, by the device and using a natural language processing model, the first document into first sentences; receiving, by the device, a second document from a second client device that is different from the first client device; parsing, by the device and using the natural language processing model, the second document into second sentences; selecting, by the device, a first sentence of the first document and a second sentence of the second document; converting, by the device and using an encoding model, the first sentence into a first vector and the second sentence into a second vector; determining, by the device and using a similarity analysis, a similarity score associated with the first vector and the second vector; determining, by the device and based on the similarity score, that a word set in the second sentence corresponds to a reference annotation; and performing, by the device, an action associated with the reference annotation.

In some implementations, a device includes one or more memories; and one or more processors, communicatively coupled to the one or more memories. The one or more processors may be configured to: receive, from a first client device, a first set of vectors associated with a first document that is associated with the first client device; receive, from a second client device, a second set of vectors associated with a second document that is associated with the second client device; wherein the first document and the second document are independently generated and are a same type of document; obtain an unannotated word set from a reference data structure; convert, using an encoding model, the unannotated word set into a subject vector; compare, using a similarity analysis, the subject vector with individual vectors of the first set of vectors and individual vectors of the second set of vectors; determine, based on the similarity analysis, a similarity score associated with the subject vector, a first vector of the first set of vectors, and a second vector of the second set of vectors; determine, based on the similarity score, that the unannotated word set is associated with a first word set associated with the first vector and a second word set associated with the second vector; generate a reference annotation for the unannotated word set based on the first word set and the second word set; and perform an action associated with the reference annotation.

In some implementations, a non-transitory computer-readable medium storing a set of instructions includes one or more instructions that, when executed by one or more processors of a device, cause the device to: receive a first set of vectors associated with a first document; receive a second set of vectors associated with a second document; compare, using a similarity analysis, a first vector of the first set of vectors with a second vector of the second set of vectors; determine, based on the similarity analysis, a similarity score associated with the first vector and the second vector; determine, based on the similarity score and using an encoding model, that a first word set of the first document is associated with a second word set of the second document; generate, using a natural language processing model, a reference annotation based on the first word set and the second word set; and perform an action associated with the reference annotation.

DETAILED DESCRIPTION

Figure 1A:
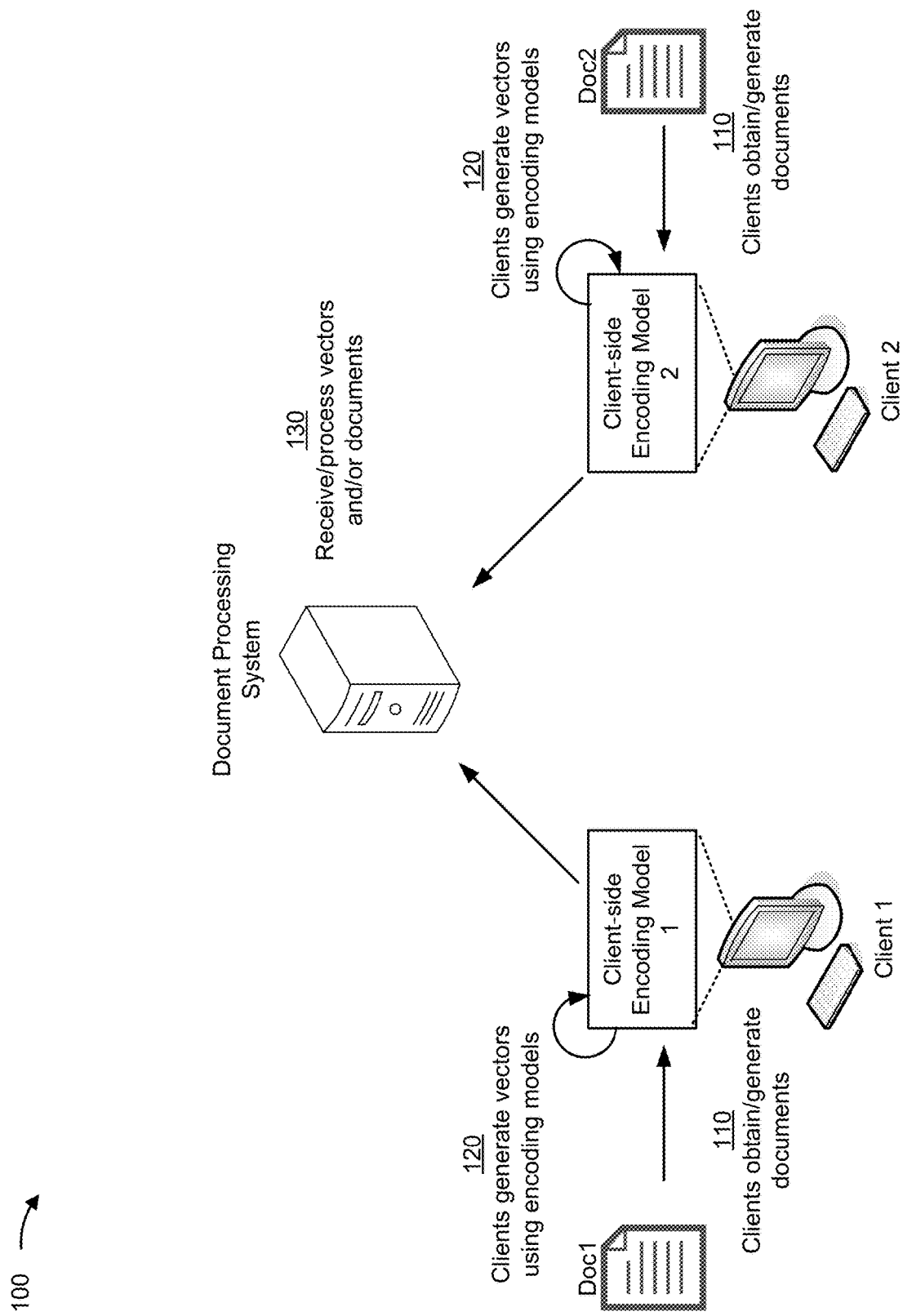
FIGS. 1A-1C are diagrams of an example implementation described herein.

The following detailed description of example implementations refers to the accompanying drawings. The same reference numbers in different drawings may identify the same or similar elements.

A user may create a document and may wish to determine whether the document complies with one or more standards. As an example, the document may be an internal policy document of an entity (e.g., a company). The user may wish to determine whether the policy document complies with governmental rules and regulations, whether the policy document complies with rules and regulations of the entity, whether terms and conditions included in the policy document are similar to terms included in corresponding policy documents of other entities, whether the policy document includes terms and conditions commonly included in corresponding policy documents of other entities, and/or whether the policy document includes terms and conditions that are not commonly included in corresponding policy documents of other entities.

However, due to the confidential nature of the internal policy document, the user may be unwilling to share the policy document with other entities and/or other entities may be unwilling to share their policy documents with the user. Thus, the user may be unable to determine whether the policy document includes terms and conditions commonly included in corresponding policy documents of other entities and/or whether the policy document includes terms and conditions that are not commonly included in corresponding policy documents of other entities.

Additionally, there may be a large number of governmental rules and regulations and/or rules and regulations of the entity that relate to the policy document. As such, the user may utilize large amounts of computing resources (e.g., processing resources, memory resources, communication resources, and/or other types of computing resources), time, and/or human resources to obtain all the rules and regulations relating to the policy document and to determine whether the terms and conditions included in the policy document comply with the related rules and regulations.

Some implementations described herein relate to a document processing system that utilizes federated learning to generate and/or validate a reference document (e.g., a policy document) without sharing confidential information included in the reference document with other users and/or other devices. For example, the document processing system may receive, from a client device, a set of first vectors associated with a document that is associated with the client device. The client device may utilize a client-side encoding model to generate the set of first vectors.

The document processing system may obtain a word set from a reference data structure. In some implementations, the reference data structure may be a data structure (e.g., a database, a list, a table, and/or another type of data structure) storing rules and regulations relating to a subject matter of the document, sentences commonly found in documents of the same type as the document, and/or another type of reference data related to the document. In some implementations, the reference data structure may be a second document that is a same type of document as the document.

The document processing system may convert, using a server-side encoding model, the word set into a second vector. The document processing system may compare, using a similarity analysis, the second vector with individual first vectors of the set of first vectors. The document processing system may determine, based on the similarity analysis, a similarity score associated with the second vector and a first vector of the set of first vectors. The document processing system may determine, based on the similarity score, that the word set is associated with a first word set associated with the first vector. The document processing system may generate a reference annotation for the first word set. The reference annotation may enable the client device to identify the word set and/or may indicate that the first word set is similar to the word set. For example, the word set may correspond to a rule or regulation (e.g., that documents related to a particular type of transaction are to be maintained for a quantity of years) and the reference annotation may indicate that the first word set complies with the rule or regulation (e.g., that the word set indicates that documents related to the particular type of transaction are to be maintained for the quantity of years). The document processing system may provide the reference annotation to the client device.

In this way, the client device may determine whether a document complies with governmental rules and regulations, whether the policy document complies with rules and regulations of the entity, whether terms and conditions included in the policy document are similar to terms included in corresponding policy documents of other entities, whether the policy document includes terms and conditions commonly included in corresponding policy documents of other entities, and/or whether the policy document includes terms and conditions that are not commonly included in corresponding policy documents of other entities without sharing the document with other entities (e.g., other users and/or other devices).

Additionally, the document processing system may conserve computing resources, time, and/or human resources that otherwise would have been utilized to obtain all the rules and regulations relating to the document and to determine whether the terms and conditions included in the document comply with the related rules and regulations.

Figure 1B:
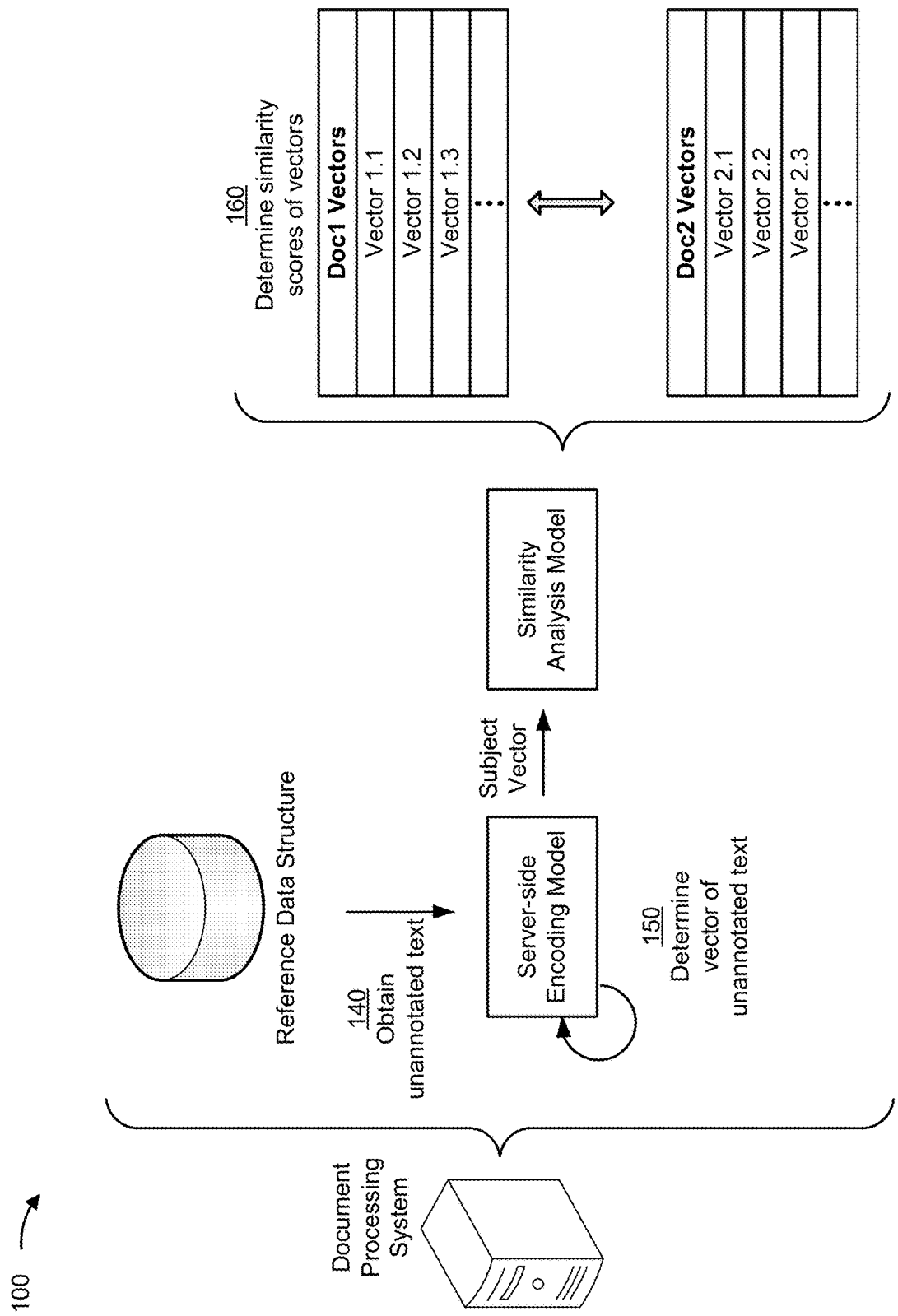
Figure 1C:
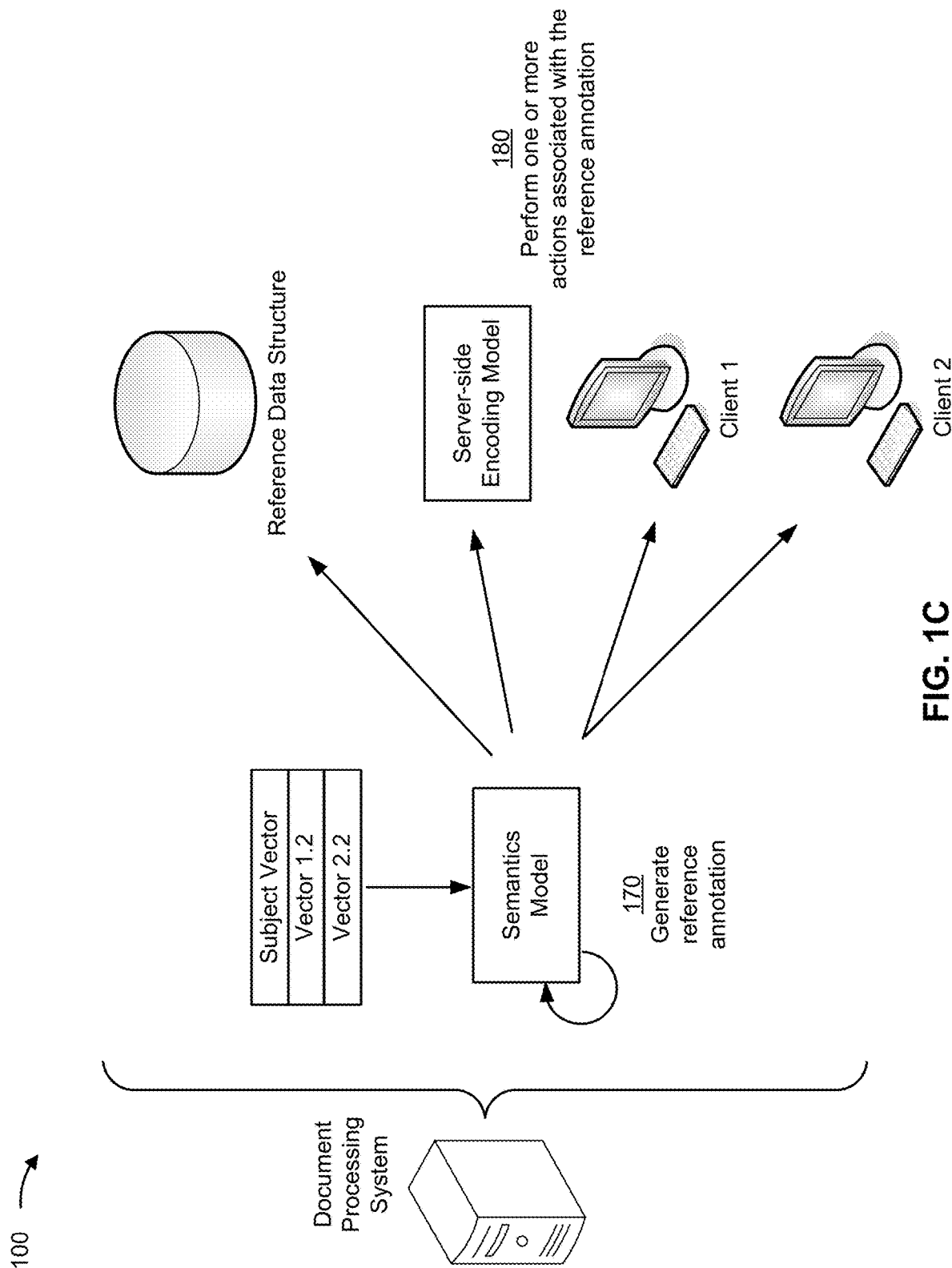

FIGS. 1A-1C are diagrams of one or more example implementations 100 described herein. As shown in FIGS. 1A-1C, a group of client devices are associated with a document processing system. Each client device may include a communication device and/or a computing device configured to utilize a federated learning system in association with generating a reference document, as described herein. For example, a client device, of the group of client devices, may include a computing device, such as a desktop computer. Although two client devices are depicted in FIGS. 1A-1C, in practice the federated learning system may include additional client devices. For example, the federated learning system may include tens, hundreds, or even thousands of client devices.

The document processing system may include a communication device and/or a computing device configured to utilize a federated learning system in association with generating a reference document, as described herein. For example, the document processing system may include a server, an application server, a client server, a web server, a database server, a host server, a proxy server, a virtual server (e.g., executing on computing hardware), a server in a cloud computing system, a device that includes computing hardware used in a cloud computing environment, or a similar type of device.

As shown in FIG. 1A, and by reference number 110, the client devices obtain and/or generate documents. For example, as shown in FIG. 1A, a first client device (shown as Client 1) obtains and/or generates a first document (shown as Doc 1) and a second client device (shown as Client 2) obtains and/or generates a second document (shown as Doc 2). The second client device may obtain and/or generate the second document independently from the first client device.

The first document and the second document may be the same type of document. For example, the first document and the second document may be associated with the same topic and/or may be associated with the same purpose (e.g., to establish rules and/or guidelines related to a particular policy). The first document and the second document may include information that is to be maintained as private or confidential information. For example, the first document and/or the second document may include a private policy document associated with organizational operations of an entity, a private transactional document associated with organizational transactions of the entity, a software code document associated with running software, and/or another type of document that includes information that is to be maintained as private or confidential information.

In some implementations, the first document and/or the second document may be obtained from another device. For example, the first client device may obtain the first document from a server device, from a portable memory device, and/or another type of device.

Alternatively, and/or additionally, the first document and/or the second document may be generated by the first client device and/or the second client device, respectively, based on input provided by a user. For example, a user may utilize a word processing application executing on the first client device to input text data. The first client device may generate the first document based on the text data input by the user.

As shown by reference number 120, the client devices generate vectors using client-side encoding models. The client-side encoding models may utilize a function that maps a sentence to a fixed-length vector representation of the sentence. For example, the client-side encoding models may include a bi-directional encoder representations from transformers (BERT) model. In some implementations, the client devices generate and/or train the client-side encoding models. For example, the first client device may generate and/or train a first client-side encoding model and/or the second client device may generate and/or train a second client-side encoding model, in a manner similar to that described below with respect to FIG. 2.

In some implementations, the client devices obtain a trained client-side encoding model from another device. For example, the first client device and/or the second client device may obtain a trained client-side encoding model from the document processing system. The document processing system may generate and/or train a server-side encoding model and may provide the trained encoding model to the first client device and/or the second client device. In some implementations, the document processing system trains the server-side encoding model in a manner similar to that described below with respect to FIG. 2.

The first client device and/or the second client device may receive the trained encoding model and may utilize the trained encoding model to determine vectors based on the first document and the second document, respectively. For example, the first client device may parse the first document into sentences. In some implementations, the first client device utilizes a natural language processing (NLP) model that utilizes one or more NLP techniques to parse the first document into a set of first sentences.

In some implementations, the first client device executes a first NLP technique for analyzing unstructured documents. For example, the first client device may analyze unstructured documents using a token-based NLP technique (e.g., a technique using regular expressions), a category-based NLP technique (e.g., a named entity recognition (NER) technique), an approximation-based NLP technique (e.g., a fuzzy text search technique), and/or the like. Additionally, or alternatively, the first client device may analyze structured documents using a second NLP technique (e.g., a metadata-based NLP technique and/or a similar type of technique).

The first client device may select a first sentence of the first document. In some implementations, the first client device may select the first sentence based on the first sentence being an initial sentence of the first document. As an example, the first client device may determine to generate a first vector for each sentence of the first document. The first client device may select the first sentence based on the first sentence being the initial sentence of the first document. The first client device may subsequently select the second sentence of the first document and may continue in a similar manner to generate a first vector for each sentence included in the first document.

In some implementations, the document processing system determines to process one or more sentences of the first document that are associated with a particular topic (e.g., network security, document retention, and/or the like). The first document may include a plurality of sections. Each section may be associated with a respective label, such as a title, a heading, a sub-heading, and/or another type of label. The first client device may determine that a first label associated with a first section of the first document is associated with a particular topic based on performing one or more NLP techniques. The first client device may identify a first sentence within the first section. The first client device may determine that the first sentence is associated with the particular topic based on the first sentence being included in the first portion of the first document and/or based on the first portion of the document being associated with the first label. The first client device may select the first sentence based on the first sentence being associated with the particular topic.

The first client device may provide the first sentence to the first client-side encoding model as an input. The first client-side encoding model may process the first sentence to generate a first vector. In some implementations, the first client device utilizes the first client-side encoding model to generate a set of first vectors. For example, the first client device may provide a set of first sentences included in the first document to the client-side encoding model as inputs. The set of first sentences may include every sentence included in the first document, a set of sentences associated with a particular label included in the first document, a set of sentences associated with a particular topic, a set of sentences forming a paragraph within the first document, among other examples of sets of sentences. The first client-side encoding model may process the set of first sentences to generate the set of first vectors.

In some implementations, the first client device determines a first reference annotation associated with the first vector. The first reference annotation may enable the client device to identify the first sentence and/or may indicate that the first sentence is similar to a word set from which the first reference annotation was generated. For example, the word set may correspond to a rule or regulation (e.g., that documents related to a particular type of transaction are to be maintained for a quantity of years) and the reference annotation may indicate that the first sentence complies with the rule or regulation (e.g., that the first sentence indicates that documents related to the particular type of transaction are to be maintained for the quantity of years).

The first client device may maintain a data structure storing reference vectors in association with reference annotations. In some implementations, the first client device generates the information stored in the data structure. As an example, the first client device may obtain a reference document (e.g., a governmental rule or regulation). The first client device may parse the reference document into sentences using one or more NLP techniques. The first client device may determine a label and/or other information associated with each sentence. The first client device may generate a respective reference annotation associated with each sentence based on the label and/or other information associated with each sentence. The first client device may process each sentence with the client-side encoding model to generate a respective reference vector for each sentence. For example, the reference vectors may be generated based on utilizing the client-side encoding model to process sentences included in a governmental rule or regulation, sentences included in documents of the same type as the first document, sentences from documents associated with a same topic as the first document, as well as sentences from other types of documents. The first client device may store the reference vectors in association with the respective reference annotations in the data structure.

In some implementations, the first client device obtains the information stored in the data structure from another device. For example, the first client device may obtain the information stored in the data structure from the document processing system and/or from the second client device. In some implementations, the information stored in the data structure corresponds to a set of vectors, and a set of annotations associated with the set of vectors, used to train the client-side encoding model.

In some implementations, the first client device maintains a plurality of data structures. A data structure, of the plurality of data structures, may be associated with a type of document and/or a topic. The first client device may determine a type of the first document and/or a topic associated with the first document. The first client device may identify a data structure, of the plurality of data structures, associated with the type of the first document and/or the topic associated with the first document and may determine the reference annotation based on a reference vector stored in the data structure.

The first client device may utilize a similarity analysis to determine a similarity score indicating a similarity between the first vector and a reference vector stored in a data structure. For example, the first client device may provide the first vector as an input to a k-nearest neighbor model. The k-nearest neighbor model may utilize a k-nearest neighbor algorithm to determine a set of reference vectors similar to the first vector and/or a respectively similarity score indicating a similarity between the first vector and each reference vector included in the set of reference vectors.

The first client device may associate the first vector with a first reference annotation associated with a reference vector, of the set of reference vectors, based on whether the similarity score determined with respect to the reference vector satisfies a score threshold. In some implementations, the similarity score satisfies the threshold score. The first client device may determine that the first vector is associated with the reference vector based on the similarity score satisfying the threshold score. The first client device may identify a first reference annotation associated with the reference vector. The first client device may associate the first vector with the first reference annotation based on the first vector being associated with the reference vector. In some implementations, the first client device may associate the first vector with the first reference annotation by modifying the first vector to include information identifying the first reference annotation. The first client device may determine that the first vector is an annotated vector based on associating the first vector with the first reference annotation.

In some implementations, the similarity score fails to satisfy the threshold score. The first client device may determine that the first vector is not associated with the reference vector based on the similarity score failing to satisfy the threshold score. The first client device may determine that the first vector is an unannotated vector based on the first vector not being associated with the reference vector.

The first client device may process the remaining first sentences, of the set of first sentences, to generate a set of first vectors and/or determine a set of first reference annotations, in a manner similar to that described above.

The first client device may provide the first vector to the document processing system.

In some implementations, the first vector includes the annotated vector. The first client device may provide the first vector to the document processing system based on the first vector comprising the annotated vector. In this way, the document processing system may utilize the first vector and/or the reference annotation to determine a reference annotation associated with unannotated text and/or unannotated vectors stored in a memory of the document processing system, as described in greater detail below. Alternatively, and/or additionally, the document processing system may utilize the first vector and/or the reference annotation to retrain the server-side encoding model, as described in greater detail below. In this way, a federated learning process may be performed without confidential information being shared between the devices included in the federation learning system (e.g., the document processing system, the first client device, and the second client device).

In some implementations, the first vector includes the unannotated vector. The first client device may provide the first vector to the document processing system based on the first vector comprising the unannotated vector. In this way, the first client device may utilize the document processing system (e.g., the server-side encoding model) to determine a reference annotation associated with the first vector without sharing confidential information with the document processing system.

The second client device may generate a set of second vectors using a second client-side encoding model. The second client device may generate the second vector and/or the second set of vectors in a manner similar to that described above. The second client device may provide the second vector and/or the second set of vectors to the document processing system. In some implementations, the second client device may determine a set of second reference annotations associated with the set of second vectors. For example, the second client device may determine the set of second reference annotations in a manner similar to that described above.

As shown by reference number 130, the document processing system receives and processes the set of first vectors and the set of second vectors. For example, the document processing system may receive the first vector and/or the set of first vectors from the first client device and may receive the second vector and/or the set of second vectors from the second client device. The document processing system may process the set of first vectors and the set of second vectors based on receiving the set of first vectors and the set of second vectors from the first and second client devices, respectively.

In some implementations, the document processing system may generate one or more of the vectors (e.g., the first vector, the second vector, the set of first vectors, and/or the set of second vectors). As an example, the first client device and/or the second client device may provide the first document and/or the second document, respectively, to the document processing system. The document processing system may receive the first document and/or the second document and may utilize a server-side encoding model to generate one or more of the vectors. In some implementations, the server-side encoding model may generate one or more of the vectors in a manner similar to that described above.

In some implementations, the document processing system utilizes a similarity analysis to determine a first similarity score associated with the first vector and/or a second similarity score associated with the second vector. For example, the document processing system may utilize a similarity analysis to determine a first similarity score indicating a similarity between the first vector and a reference vector stored in a data structure associated with the document processing system. The document processing system may determine the second similarity score for the second vector in a similar manner.

The document processing system may determine that the first vector corresponds to a reference annotation based on the first similarity score. The document processing system may determine that the first similarity score satisfies a threshold similarity score. The document processing system may determine that the first vector corresponds to the reference vector based on the first similarity score satisfying the score threshold. The document processing system may determine a reference annotation associated with the reference vector based on the first vector corresponding to the reference vector. The document processing system may determine that the first vector corresponds to the reference annotation based on the reference annotation being associated with the reference vector.

In some implementations, the document processing system verifies the first sentence based on determining that the first vector corresponds the reference annotation. The first vector may be the annotated vector and the document processing system may determine whether the reference annotation associated with the first vector corresponds to the reference annotation determined by the document processing system. For example, the document processing system may determine whether the first reference annotation is the same as the reference annotation and/or whether the first reference annotation and the reference annotation indicate the same type of information. The document processing system may verify the first vector when the reference annotation associated with the first vector corresponds to the reference annotation determined by the document processing system.

In some implementations, the first vector is the unannotated vector. The document processing system may associate the first vector with the reference annotation based on determining that the first vector corresponds to the reference annotation.

In some implementations, the document processing system processes the second vector based on the second similarity score in a manner similar to that described above. The document processing system may determine, based on the first vector and the second vector being associated with the reference annotation, that a first word set in the first sentence and a second word set in the second sentence are associated with the reference annotation.

In some implementations, the document processing system utilizes the first vector and/or the second vector to determine a reference annotation for unannotated text. As shown in FIG. 1B, and by reference number 140, the document processing system obtains unannotated text. In some implementations, the unannotated text may correspond to text (e.g., a word set) from which an unannotated vector received by the document processing system (e.g., from the first client device, the second client device, and/or another client device) was generated.

As shown by reference number 150, the document processing system determines a vector based on the unannotated text. The document processing system may provide the unannotated text as an input to the server-side encoding model. The server-side encoding model may process the unannotated text to generate a subject vector.

As shown by reference number 160, the document processing system determines similarity scores of the vectors. The document processing system may compare, using the similarity analysis, the subject vector with individual vectors of the first set of vectors and individual vectors of the second set of vectors. The document processing system may compare, using the similarity analysis, the subject vector with individual vectors of the first set of vectors and individual vectors of the second set of vectors. The document processing system may determine one or more individual vectors corresponding to the subject vector based on the comparison.

As an example, the document processing system may utilize the similarity analysis to determine a first similarity score indicating a similarity between a first vector, of the first set of vectors, and the subject vector and/or a second similarity score indicating a similarity between a second vector, of the second set of vectors, and the subject vector. The document processing system may determine that the first vector and the second vector correspond to the subject vector based on the first similarity score and the second similarity score satisfying the threshold score.

As shown in FIG. 1C, and by reference number 170, the document processing system generates a reference annotation. The document processing system may determine a reference annotation associated with the subject vector based on the first annotation associated with the first vector and/or the second annotation associated with the second vector.

In some implementations, the reference annotation corresponds to the first annotation associated with the first vector. For example, the document processing system may determine that the reference annotation corresponds to the first annotation associated with the first vector based on the first similarity score indicating that a similarity between the subject vector and the first vector is greater than a similarity between the subject vector and the second vector, based on the first similarity score satisfying a second score threshold, and/or based on the second similarity score failing to satisfy the second score threshold.

In some implementations, the reference annotation corresponds to the second annotation associated with the second vector. For example, the document processing system may determine that the reference annotation corresponds to the second annotation associated with the second vector based on the second similarity score indicating that a similarity between the subject vector and the second vector is greater than a similarity between the subject vector and the first vector, based on the first similarity score failing to satisfy the second score threshold, and/or based on the second similarity score satisfying the second score threshold.

In some implementations, the reference annotation is determined based on the first reference annotation and the second reference annotation. For example, the reference annotation may include a semantical representation of the first sentence and the second sentence. The document processing system may deconstruct the first vector to generate the first sentence and may deconstruct the second vector to generate the second sentence. The document processing system may utilize one or more NLP techniques to generate a semantical representation of the first sentence and the second sentence. The document processing system may determine the reference annotation based on the semantical representation of the first sentence and the second sentence.

As shown by reference number 180, the document processing system performs one or more actions associated with the reference annotation. In some implementations, the one or more actions include storing the reference annotation in the data structure associated with the document processing system. For example, the document processing system may store the reference annotation determined for the subject vector in association with the unannotated text to convert the unannotated text into annotated text. In this way, the document processing system may utilize reference annotations learned by the client-side encoding models to annotate unannotated text without confidential information being shared between the client devices and the document processing system.

In some implementations, the one or more actions include retraining the server-side encoding model. The document processing system may utilize the subject vector, the reference annotation, the first vector, the first reference annotation, the second vector, and/or the second reference annotation to retrain the server-side side encoding model. In this way, the document processing system may utilize reference annotations learned by the client-side encoding models to retrain the server-side encoding model, thereby sharing knowledge learned by the client-side encoding models with the server-side encoding model, without confidential information being shared between the client devices and the document processing system.

In some implementations, the one or more actions include providing the reference annotation to the first client device and/or the second client device. The document processing system may provide information identifying the reference annotation to the first client device and/or the second client device. The first client device and/or the second client device may receive the information identifying the reference annotation and may utilize the reference annotation to annotate the first sentence and/or the second sentence and/or the retrain the first client-side encoding model and/or the second client-side encoding model. In this way, the document processing system may share knowledge learned by the server-side encoding model with the first client-side encoding model and/or the second client-side encoding model without sharing confidential information between the devices.

In some implementations, the one or more actions include providing model update data to the first client device and/or the second client device. The model update data may include information identifying a set of variables (e.g., weights, classifications, reference annotations, and/or other variables) utilized by the server-side encoding model. The first client device and/or the second client device may receive the model update data and may update the first client-side encoding model and/or the second client-side encoding model, respectively, based on the model update data. For example, the first client device may modify values of a set of variables of the first client-side encoding model to correspond to values of the set of variables of the server-side encoding model identified in the model update data. In this way, the document processing system may share knowledge learned by the server-side encoding model with the first client-side encoding model and/or the second client-side encoding model without sharing confidential information between the devices.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
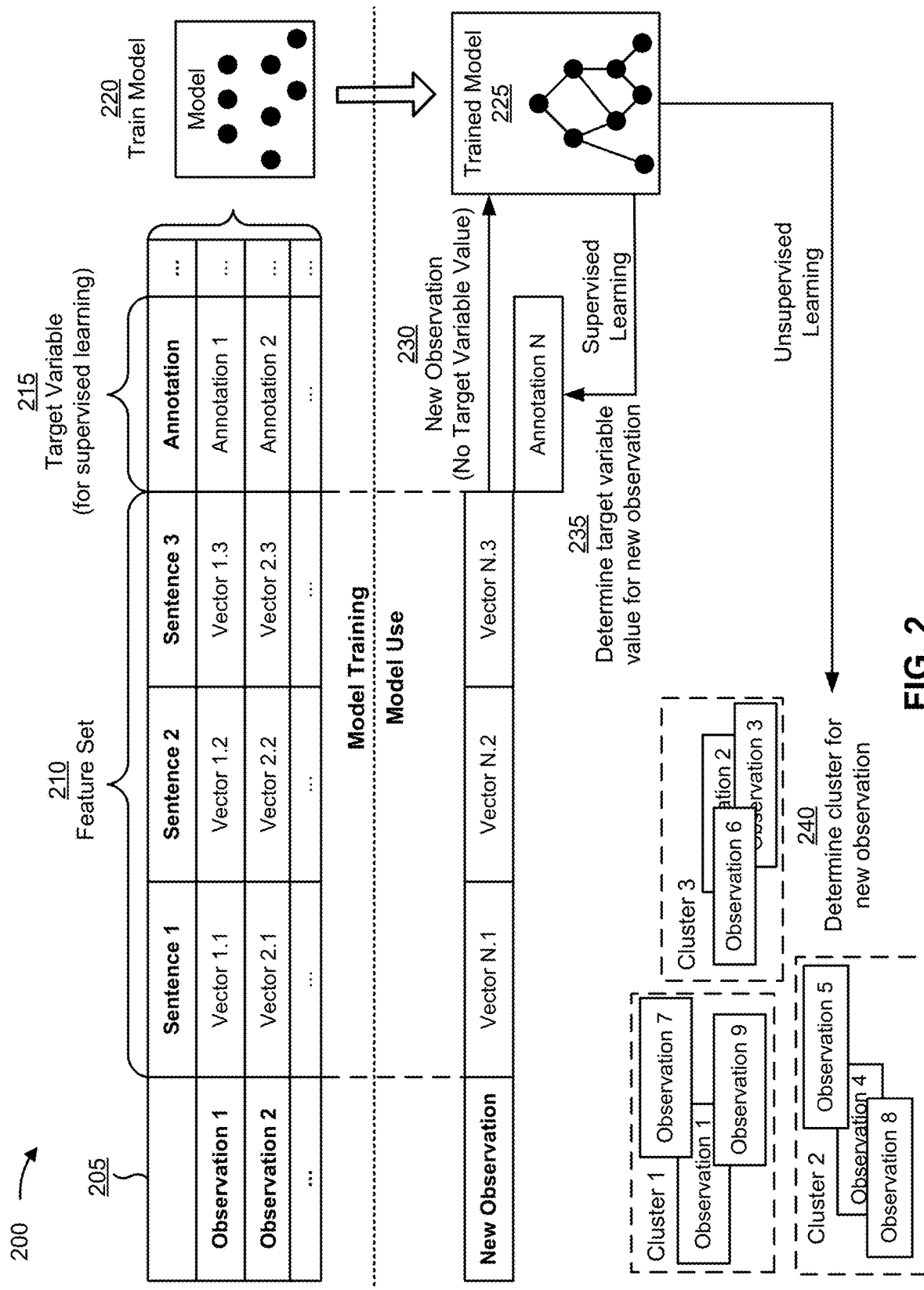
FIG. 2 is a diagram illustrating an example of training and using a machine learning model in connection with reference document generation using a federated learning system.

FIG. 2 is a diagram illustrating an example 200 of training and using a machine learning model in connection with reference document generation using a federated learning system. The machine learning model training and usage described herein may be performed using a machine learning system. The machine learning system may include or may be included in a computing device, a server, a cloud computing environment, and/or the like, such as the document processing system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the document processing system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the document processing system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of Sentence 1, a second feature of Sentence 2, a third feature of Sentence 3, and so on. As shown, for a first observation, the first feature may have a value of Vector 1.1 indicating a vector associated with a first sentence of a first document, the second feature may have a value of Vector 1.2 indicating a vector associated with a second sentence of the first document, the third feature may have a value of Vector 1.3 indicating a vector associated with a third sentence of the first document, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 200, the target variable is Annotation, which has a value of Annotation 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of Vector N.1, a second feature of Vector N.2, a third feature of Vector N.3, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of Annotation N for the target variable of Annotation for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a cluster associated with a first annotation), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determining reference annotations associated with sentences of a document. The machine learning system enables recognition and/or identification of tens, hundreds, thousands, or millions of features and/or feature values for tens, hundreds, thousands, or millions of observations, thereby increasing accuracy and consistency and reducing delay associated with determining the reference annotations relative to requiring computing resources to be allocated for tens, hundreds, or thousands of operators to manually determining the reference annotations using the features or feature values.

As indicated above, FIG. 2 is provided as an example. Other examples may differ from what is described in connection with FIG. 2.

Figure 3:
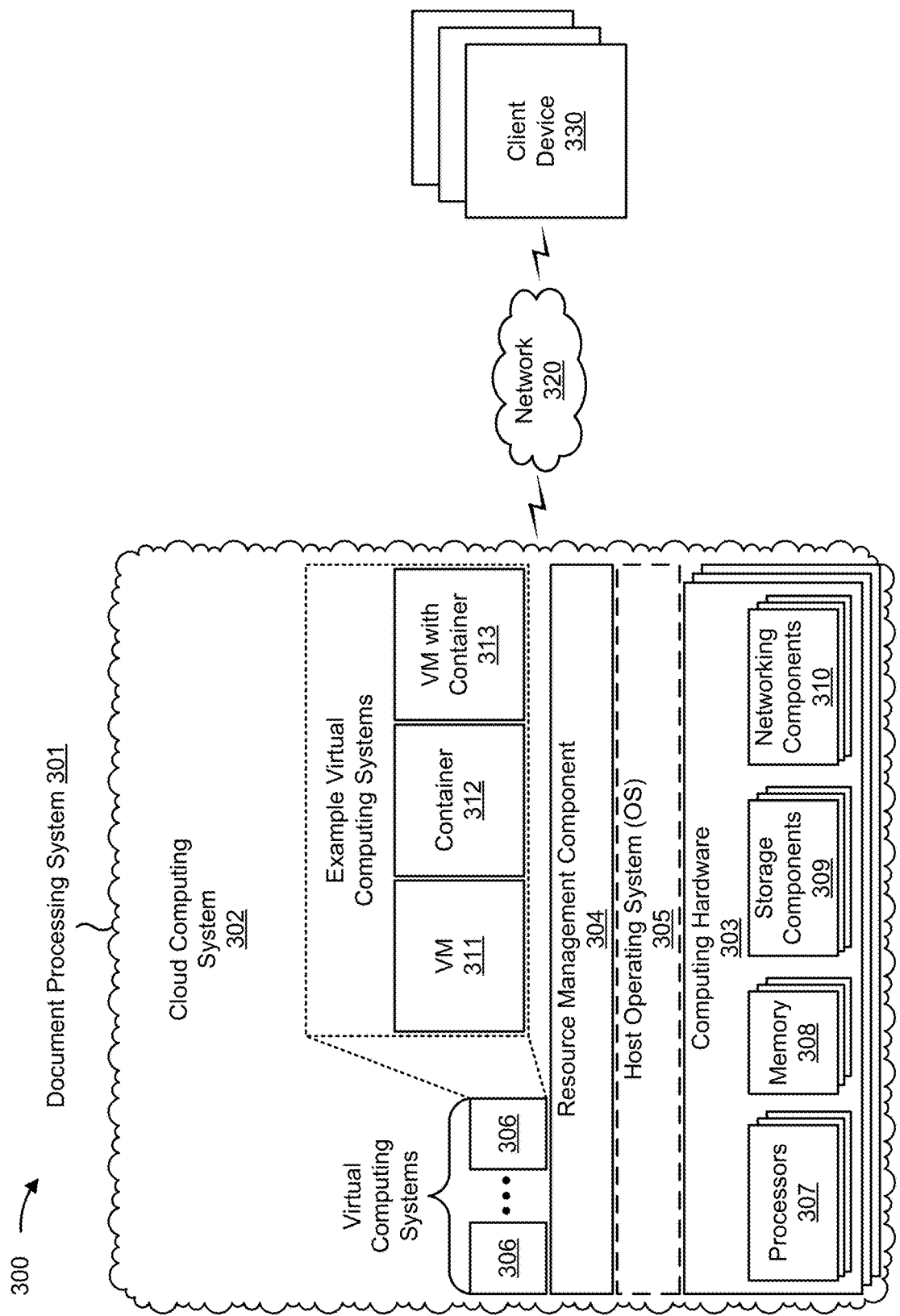
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a document processing system 301, which may include one or more elements of and/or may execute within a cloud computing system 302. The cloud computing system 302 may include one or more elements 303-313, as described in more detail below. As further shown in FIG. 3, environment 300 may include a network 320 and/or one or more client devices 330 (collectively referred to as "client devices 330" and individually referred to as "client device 330). Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the document processing system 301 may include one or more elements 303-313 of the cloud computing system 302, may execute within the cloud computing system 302, and/or may be hosted within the cloud computing system 302, in some implementations, the document processing system 301 may not be cloud-based (e.g., may be implemented outside of a cloud computing system) or may be partially cloud-based. For example, the document processing system 301 may include one or more devices that are not part of the cloud computing system 302, such as device 400 of FIG. 4, which may include a standalone server or another type of computing device. The document processing system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

Client device 330 includes one or more devices capable of receiving, generating, storing, processing, and/or providing information associated with reference document generation using a federated learning system, as described elsewhere herein. Client device 330 may include a communication device and/or a computing device. For example, the client device 330 may include a wireless communication device, a user equipment (UE), a mobile phone (e.g., a smart phone or a cell phone, among other examples), a laptop computer, a tablet computer, a handheld computer, a desktop computer, an Internet of Things (IoT) device, or a similar type of device. Client device 330 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
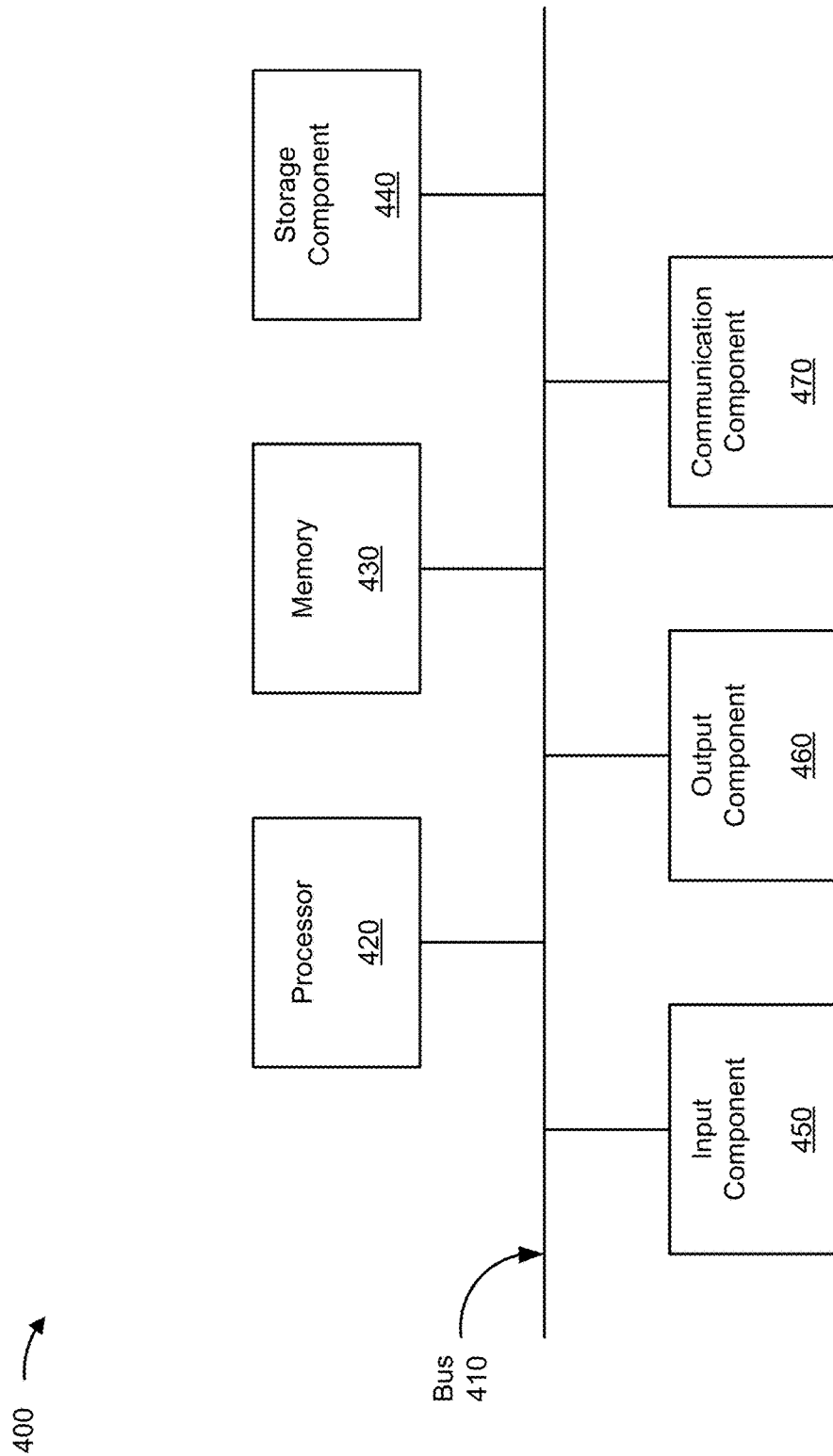
FIG. 4 is a diagram of example components of one or more devices of FIG. 3.

FIG. 4 is a diagram of example components of a device 400, which may correspond to document processing system 301 and/or client device 330. In some implementations, document processing system 301 and/or client device 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
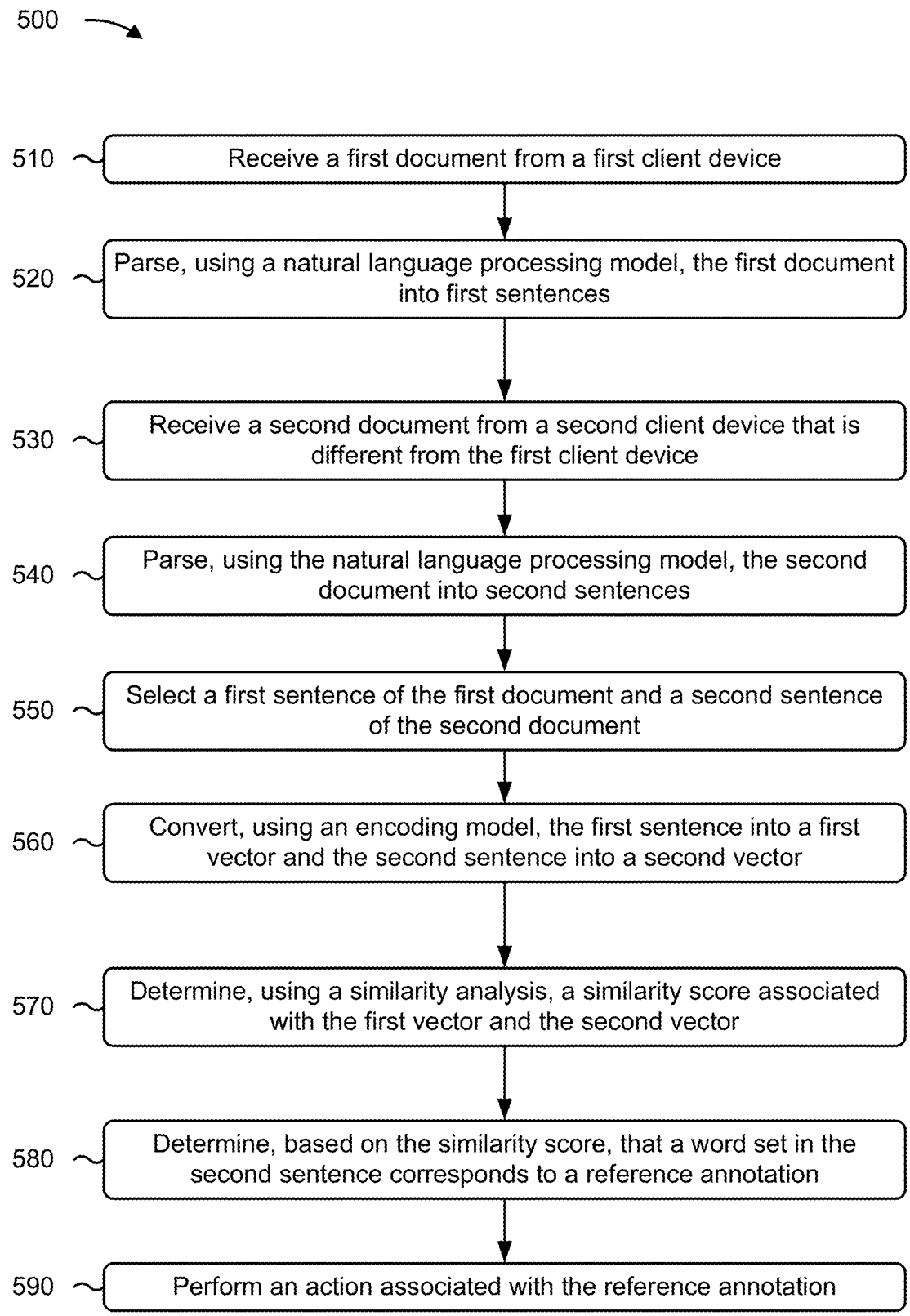
FIGS. 5 and 6 are flowcharts of example processes relating to reference document generation using a federated learning system.

FIG. 5 is a flowchart of an example process 500 associated with reference document generation using a federated learning system. In some implementations, one or more process blocks of FIG. 5 may be performed by a device (e.g., document processing system 301). In some implementations, one or more process blocks of FIG. 5 may be performed by another device or a group of devices separate from or including the device, such as a client device (e.g., client device 330). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving a first document from a first client device (block 510). For example, the device may receive a first document from a first client device, as described above.

As further shown in FIG. 5, process 500 may include parsing, using a natural language processing model, the first document into first sentences (block 520). For example, the device may parse, using a natural language processing model, the first document into first sentences, as described above.

As further shown in FIG. 5, process 500 may include receiving a second document from a second client device that is different from the first client device (block 530). For example, the device may receive a second document from a second client device that is different from the first client device, as described above. The first document and the second document may be a same type of document. For example, the type of document may comprise at least one of a private policy document associated with organizational operations, a private transactional document associated with organizational transactions, or a software code document associated with running software.

As further shown in FIG. 5, process 500 may include parsing, using the natural language processing model, the second document into second sentences (block 540). For example, the device may parse, using the natural language processing model, the second document into second sentences, as described above.

As further shown in FIG. 5, process 500 may include selecting a first sentence of the first document and a second sentence of the second document (block 550). For example, the device may select a first sentence of the first document and a second sentence of the second document, as described above. In some implementations, selecting the first sentence and the second sentence comprises determining that a first label of the first document is associated with a particular topic, determining that a second label of the second document is associated with the particular topic, identifying that the first sentence is associated with the particular topic based on being associated with the first label within the first document, identifying that the second sentence is associated with the particular topic based on being associated with the second label within the second document, and selecting the first sentence and the second sentence based on the first sentence and the second sentence being associated with the particular topic.

As further shown in FIG. 5, process 500 may include converting, using an encoding model, the first sentence into a first vector and the second sentence into a second vector (block 560). For example, the device may convert, using an encoding model, the first sentence into a first vector and the second sentence into a second vector, as described above. The encoding model comprises a bidirectional encoder representations from transformers (BERT) model.

As further shown in FIG. 5, process 500 may include determining, using a similarity analysis, a similarity score associated with the first vector and the second vector (block 570). For example, the device may determine, using a similarity analysis, a similarity score associated with the first vector and the second vector, as described above.

As further shown in FIG. 5, process 500 may include determining, based on the similarity score, that a word set in the second sentence correspond to a reference annotation (block 580). For example, the device may determine, based on the similarity score, that a word in the second sentence correspond to a reference annotation, as described above. The reference annotation may comprise a semantical representation of the word set in the second sentence.

As further shown in FIG. 5, process 500 may include performing an action associated with the reference annotation (block 590). For example, the device may perform an action associated with the reference annotation, as described above. In some implementations, performing the action comprises at least one of training the encoding model based on the reference annotation, transmitting the reference annotation to the first client device to cause the reference annotation to be associated with a word set in the first document, or transmitting the reference annotation to the second client device to cause the reference annotation to be associated with the word set in the second sentence.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
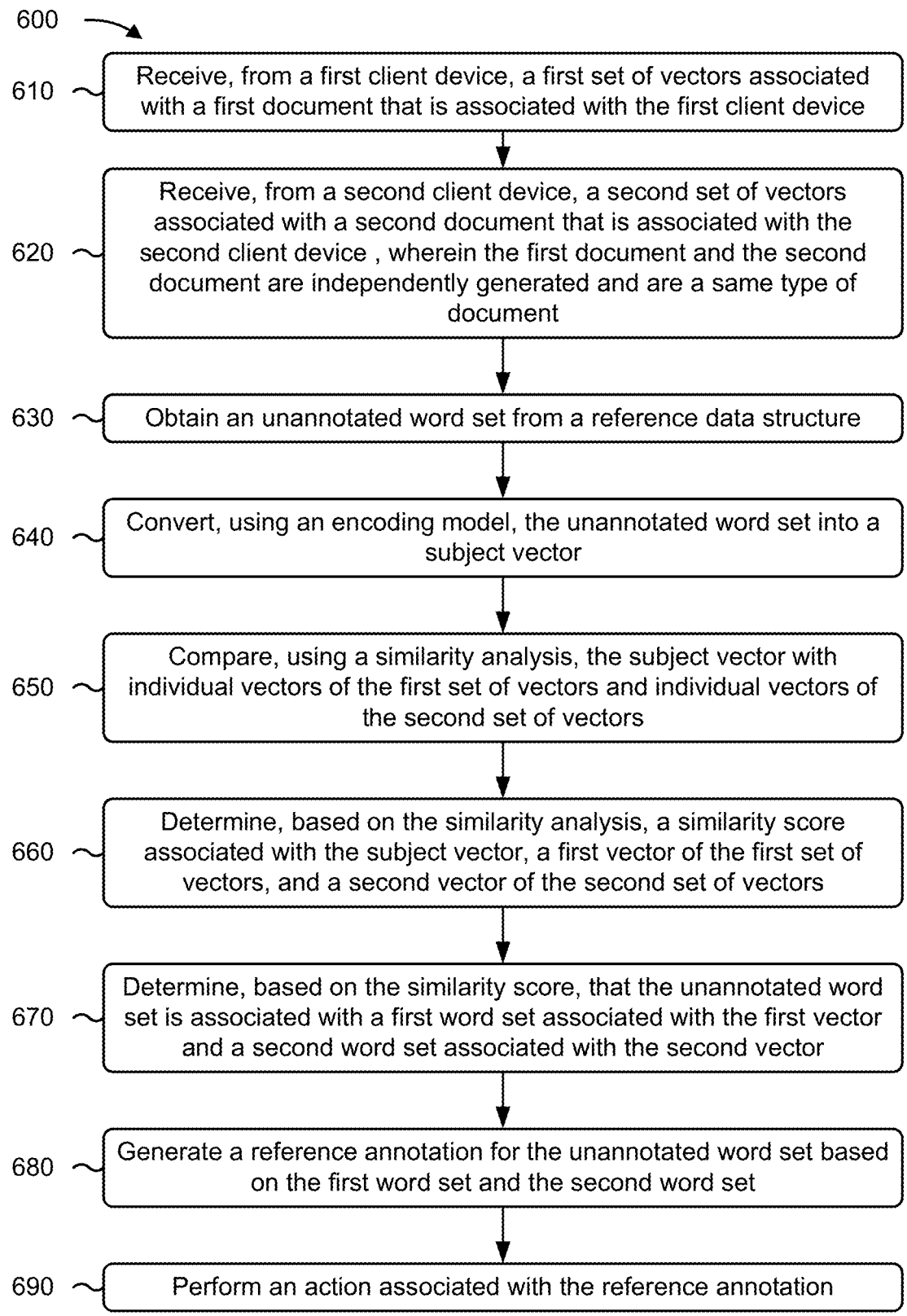

FIG. 6 is a flowchart of an example process 600 associated with reference document generation using a federated learning system. In some implementations, one or more process blocks of FIG. 6 may be performed by a device (e.g., document processing system 301). In some implementations, one or more process blocks of FIG. 6 may be performed by another device or a group of devices separate from or including the device, such as a client device (e.g., client device 330). Additionally, or alternatively, one or more process blocks of FIG. 6 may be performed by one or more components of device 400, such as processor 420, memory 430, storage component 440, input component 450, output component 460, and/or communication component 470.

As shown in FIG. 6, process 600 may include receiving, from a first client device, a first set of vectors associated with a first document that is associated with the first client device (block 610). For example, the device may receive, from a first client device, a first set of vectors associated with a first document that is associated with the first client device, as described above.

As further shown in FIG. 6, process 600 may include receiving, from a second client device, a second set of vectors associated with a second document that is associated with the second client device; wherein the first document and the second document are independently generated and are a same type of document (block 620). For example, the device may receive, from a second client device, a second set of vectors associated with a second document that is associated with the second client device; wherein the first document and the second document are independently generated and are a same type of document, as described above. In some implementations, the first document and the second document are independently generated and are a same type of document.

As further shown in FIG. 6, process 600 may include obtaining an unannotated word set from a reference data structure (block 630). For example, the device may obtain an unannotated word set from a reference data structure, as described above.

As further shown in FIG. 6, process 600 may include converting, using an encoding model, the unannotated word set into a subject vector (block 640). For example, the device may convert, using an encoding model, the unannotated word set into a subject vector, as described above. The encoding model may comprise a first encoding model. The first set of vectors may be generated from a first set of sentences of the first document using a second encoding model associated with the first client device and the second set of vectors may be generated from a second set of sentences of the second document using a third encoding model associated with the second client device.

In some implementations, the first set of vectors are generated from a first set of sentences of the first document using the encoding model and the second set of vectors are generated from a second set of sentences of the second sentence using the encoding model.

As further shown in FIG. 6, process 600 may include comparing, using a similarity analysis, the subject vector with individual vectors of the first set of vectors and individual vectors of the second set of vectors (block 650). For example, the device may compare, using a similarity analysis, the subject vector with individual vectors of the first set of vectors and individual vectors of the second set of vectors, as described above. The similarity analysis may comprise a k-nearest neighbor model.

As further shown in FIG. 6, process 600 may include determining, based on the similarity analysis, a similarity score associated with the subject vector, a first vector of the first set of vectors, and a second vector of the second set of vectors (block 660). For example, the device may determine, based on the similarity analysis, a similarity score associated with the subject vector, a first vector of the first set of vectors, and a second vector of the second set of vectors, as described above.

As further shown in FIG. 6, process 600 may include determining, based on the similarity score, that the unannotated word set is associated with a first word set associated with the first vector and a second word set associated with the second vector (block 670). For example, the device may determine, based on the similarity score, that the unannotated word set is associated with a first word set associated with the first vector and a second word set associated with the second vector, as described above.

As further shown in FIG. 6, process 600 may include generating a reference annotation for the unannotated word set based on the first word set and the second word set (block 680). For example, the device may generate a reference annotation for the unannotated word set based on the first word set and the second word set, as described above.

As further shown in FIG. 6, process 600 may include performing an action associated with the reference annotation (block 690). For example, the device may perform an action associated with the reference annotation, as described above. In some implementations, performing the action may include transmitting the reference annotation to the first client device to permit the reference annotation to be associated with the first word set in the first document, or transmitting the reference annotation to the second client device to permit the reference annotation to be associated with the second word set in the second document. Alternatively, and/or additionally, performing the action may include training the encoding model based on at least one of the reference annotation, the first word set, or the second word set.

In some implementations, the encoding model is a first model, and performing the action includes distributing the reference annotation to the first client device and the second client device, causing the first client device to train a second encoding model of the first client device based on the reference annotation, or causing the second client device to train a third encoding model of the second client device based on the reference annotation.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, a document from a client device;
   parsing, by the device and using a natural language processing model, the document into a set of sentences;

selecting, by the device, a sentence of the set of sentences;
converting, by the device and using an encoding model, the sentence into a vector;
determining, by the device and using a similarity analysis, a similarity score that indicates a level of similarity between the vector and a reference vector;
determining, by the device and based on the similarity score satisfying a score threshold, that a word set in the sentence corresponds to a reference annotation associated with the reference vector; and
transmitting, by the device, the reference annotation to the client device to cause the reference annotation to be associated with the word set in the sentence.

2. The method of claim 1, wherein the document is one of:
a private policy document associated with organizational operations;
a private transactional document associated with organizational transactions; or
a software code document associated with running software.

3. The method of claim 1, wherein the encoding model comprises a bidirectional encoder representations from transformers (BERT) model.

4. The method of claim 1, wherein selecting the sentence comprises:
determining that a label of the document is associated with a particular topic;
identifying that the sentence is associated with the particular topic based on being associated with the label within of the document; and
selecting the sentence based on the sentence being associated with the particular topic.

5. The method of claim 1, further comprising:
training the encoding model based on the reference annotation.

6. The method of claim 1, wherein the document includes information that is to be maintained as private or confidential information.

7. The method of claim 1, wherein selecting the sentence of the document comprises:
selecting the sentence based on the sentence being an initial sentence of the document.

8. A device, comprising:
one or more memories; and
one or more processors, communicatively coupled to the one or more memories, configured to:
receive, from a first client device, a first set of vectors associated with a first document that is associated with the first client device;
receive, from a second client device, a second set of vectors associated with a second document that is associated with the second client device;
wherein the first document and the second document are independently generated and are a same type of document;
obtain an unannotated word set from a reference data structure;
convert, using an encoding model, the unannotated word set into a subject vector;
compare, using a similarity analysis, the subject vector with individual vectors of the first set of vectors and individual vectors of the second set of vectors;
determine, based on the similarity analysis, a similarity score associated with the subject vector, a first vector of the first set of vectors, and a second vector of the second set of vectors;
determine, based on the similarity score, that the unannotated word set is associated with a first word set associated with the first vector and a second word set associated with the second vector;
generate a reference annotation for the unannotated word set based on the first word set and the second word set; and
perform an action associated with the reference annotation.

9. The device of claim 8, wherein the encoding model comprises a first encoding model,
wherein the first set of vectors are generated from a first set of sentences of the first document using a second encoding model associated with the first client device, and
wherein the second set of vectors were generated from a second set of sentences of the second document using a third encoding model associated with the second client device.

10. The device of claim 8, wherein the first set of vectors were generated from a first set of sentences of the first document using the encoding model, and
wherein the second set of vectors were generated from a second set of sentences of the second document using the encoding model.

11. The device of claim 8, wherein the similarity analysis comprises a k-nearest neighbor model.

12. The device of claim 8, wherein the one or more processors, when performing the action, are configured to:
transmit the reference annotation to the first client device to permit the reference annotation to be associated with the first word set in the first document; or
transmit the reference annotation to the second client device to permit the reference annotation to be associated with the second word set in the second document.

13. The device of claim 8, wherein the one or more processors, when performing the action, are configured to:
train the encoding model based on at least one of:
the reference annotation,
the first word set, or
the second word set.

14. The device of claim 8, wherein the encoding model is a first model, and wherein the one or more processors, when performing the action, are configured to:
distribute the reference annotation to the first client device and the second client device;
cause the first client device to train a second encoding model of the first client device based on the reference annotation; or
cause the second client device to train a third encoding model of the second client device based on the reference annotation.

15. A non-transitory computer-readable medium storing a set of instructions, the set of instructions comprising:
one or more instructions that, when executed by one or more processors of a device, cause the device to:
receive a set of vectors associated with a document;
compare, using a similarity analysis, a vector of the set of vectors with a reference vector;
determine, based on the similarity analysis, a similarity score that indicates a level of similarity between the vector and the reference vector;
determine, based on the similarity score satisfying a score threshold, that a word set of the document corresponds to a reference annotation associated with the reference vector; and transmit the reference annotation to cause the reference annotation to be associated with the word set in the document.

16. The non-transitory computer-readable medium of claim 15, wherein the set of vectors are received from a client device, and the reference annotation is transmitted to the client device.

17. The non-transitory computer-readable medium of claim 15, wherein the word set is associated with the vector.

18. The non-transitory computer-readable medium of claim 15, wherein reference annotation is generated using a natural language processing model,
   wherein the natural language processing model is trained according to semantics data, and
   wherein the reference annotation includes a semantic representation of the word set.

19. The non-transitory computer-readable medium of claim 15, wherein the one or more instructions further cause the device to at least one of:

train an encoding model based on the reference annotation; or store the reference annotation for use in generating another document that is associated with the document.

20. The non-transitory computer-readable medium of claim 15, wherein the one or more instructions further cause the device to:

train an encoding model based on the reference annotation;

determine model update data associated with training the encoding model; and transmit the model update data to a client device,
   wherein the model update data is used to update a local encoding model, of the client device, that is associated with the encoding model.

* * * * *

UNITED STATES PATENT AND TRADEMARK OFFICE
CERTIFICATE OF CORRECTION

| | |
|---|---|
| PATENT NO. | : 11,275,893 B1 |
| APPLICATION NO. | : 17/084187 |
| DATED | : March 15, 2022 |
| INVENTOR(S) | : Md. Faisal Zaman et al. |

It is certified that error appears in the above-identified patent and that said Letters Patent is hereby corrected as shown below:

In the Claims

In Claim 4, Column 21, Line 29, "associated with the label within of the document;" should be changed to --associated with the label of the document;--.

Signed and Sealed this
Twenty-fourth Day of May, 2022

*Katherine Kelly Vidal*

Katherine Kelly Vidal
*Director of the United States Patent and Trademark Office*